United States Patent
Dehren et al.

(10) Patent No.: US 9,045,141 B2
(45) Date of Patent: Jun. 2, 2015

(54) METHOD FOR OPERATING A VEHICLE AND VEHICLE

(75) Inventors: Oliver Dehren, Burgdorf (DE); Markus Beisswenger, Stuttgart (DE); Christian Haag, Novi, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 443 days.

(21) Appl. No.: 13/503,832

(22) PCT Filed: Oct. 25, 2010

(86) PCT No.: PCT/EP2010/066021
§ 371 (c)(1),
(2), (4) Date: Jun. 29, 2012

(87) PCT Pub. No.: WO2011/054689
PCT Pub. Date: May 12, 2011

(65) Prior Publication Data
US 2012/0259523 A1    Oct. 11, 2012

(30) Foreign Application Priority Data
Nov. 5, 2009   (DE) .......................... 10 2009 046 423

(51) Int. Cl.
*G06F 7/00* (2006.01)
*G06F 17/00* (2006.01)
*G06F 19/00* (2011.01)
*B60W 30/18* (2012.01)
*B60K 23/08* (2006.01)
*B60T 8/1755* (2006.01)
(Continued)

(52) U.S. Cl.
CPC ...... *B60W 30/18172* (2013.01); *B60K 23/0808* (2013.01); *B60T 8/1755* (2013.01); *B60T 8/1764* (2013.01); *B60T 2201/14* (2013.01); *B60W 10/119* (2013.01); *B60W 10/14* (2013.01); *B60W 10/16* (2013.01); *B60W 10/184* (2013.01); *B60W 2720/30* (2013.01)

(58) Field of Classification Search
USPC .......................................... 701/1, 48, 69–92
See application file for complete search history.

(56) References Cited

U.S. PATENT DOCUMENTS 5,067,935 A * 11/1991 Brown et al. .................. 475/248
5,205,622 A *  4/1993 Gee ............................. 303/113.2
(Continued)

FOREIGN PATENT DOCUMENTS

CN    1486882    4/2004
CN    1902070    1/2007
(Continued)

OTHER PUBLICATIONS

International Search Report for PCT/EP2010/066021, dated Mar. 22, 2011.

*Primary Examiner* — Bhavesh V Amin
(74) *Attorney, Agent, or Firm* — Kenyon & Kenyon LLP

(57) ABSTRACT

In a method for operating a vehicle which has a first axle, a second axle, a unit for determining slipping of at least one wheel of the second axle on a ground surface, and a braking device associated with the wheel, a drive torque is applied to the first axle and the second axle via a central differential, and, in the event of slipping of the wheel, a braking torque required to prevent the slipping being determined. A setpoint braking torque is set on the braking device, which is less than the required braking torque, and the part of the drive torque supplied to the first axle is increased.

19 Claims, 2 Drawing Sheets

(51) Int. Cl.
*B60T 8/1764* (2006.01)
*B60W 10/119* (2012.01)
*B60W 10/14* (2012.01)
*B60W 10/16* (2012.01)
*B60W 10/184* (2012.01)

(56) References Cited

U.S. PATENT DOCUMENTS

| | | | | |
|---|---|---|---|---|
| 5,247,443 | A | * | 9/1993 | Gilliam ............... 701/81 |
| 5,450,919 | A | * | 9/1995 | Shitani ............... 180/233 |
| 5,924,952 | A | * | 7/1999 | Bowen ............... 475/313 |
| 6,059,680 | A | * | 5/2000 | Yoshioka ............... 475/88 |
| 7,016,778 | B1 | | 3/2006 | Ehmer et al. |
| 7,175,559 | B2 | * | 2/2007 | Bowen ............... 475/225 |
| 8,672,790 | B2 | * | 3/2014 | Severinsson et al. ....... 475/5 |
| 2003/0232683 | A1 | * | 12/2003 | Teraoka et al. ........... 475/231 |
| 2004/0222027 | A1 | * | 11/2004 | Barth et al. ............... 180/197 |
| 2006/0030974 | A1 | * | 2/2006 | Tsukasaki et al. ........... 701/1 |
| 2006/0162980 | A1 | * | 7/2006 | Bowen ............... 180/247 |
| 2006/0199697 | A1 | * | 9/2006 | Kirkwood et al. ........... 477/5 |

FOREIGN PATENT DOCUMENTS

| | | |
|---|---|---|
| CN | 101374711 | 2/2009 |
| CN | 101524960 | 9/2009 |
| DE | 197 11 719 | 11/1997 |
| DE | 199 53 773 | 9/2000 |
| DE | 100 50 173 | 4/2001 |
| DE | 10 2006 025 058 | 12/2007 |
| DE | 10 2006 058 835 | 6/2008 |
| EP | 1 826 082 | 8/2007 |
| FR | 2 843 079 | 2/2004 |
| WO | WO 2007/068471 | 6/2007 |

* cited by examiner

METHOD FOR OPERATING A VEHICLE AND VEHICLE

BACKGROUND OF THE INVENTION

1. Field of the Invention

The present invention relates to a method for operating a vehicle, the vehicle having a first axle, a second axle, means for determining slipping of at least one wheel, which is provided on the second axle, on a ground surface of the vehicle, and a braking device associated with the wheel, and a drive torque being applied to the first axle and the second axle via a central differential, and, in the event of slipping of the wheel, a braking torque required for preventing the slipping being determined.

2. Description of Related Art

Methods of the above type are known from the related art. They are used for operating vehicles which have more than one driven axle. The vehicle may thus, for example, also be an all-wheel-drive vehicle, in which all axles or wheels of the vehicle are driven. The vehicle for which the described method may be used has the first axle and the second axle, which are both drivable. For this purpose, the axles may be coupled to one another via the central differential and may also have the drive torque applied thereto. Means, using which it may be determined whether the wheel is slipping on the ground surface of the vehicle, are associated with the wheel or the wheels of the second axle. If the wheel is slipping, the wheel may not transmit any force to the ground surface and therefore may not contribute to accelerating or braking the vehicle. For this reason, driver assistance systems, for example, in the form of a so-called electronic stability program (ESP), are used, which brake the wheel as soon as the slipping is determined. The braking device is associated with the wheel for the braking thereof. A braking torque or a braking force, which is to act on the wheel, may be set on the braking device. For this purpose, the braking torque which is required for preventing the slipping when the slipping occurs is initially determined.

In methods known from the related art, this required braking torque is set on the braking device. In this way, the slipping of the wheel is prevented, so that propulsion of the vehicle may still be ensured, even on a slippery ground surface. Such a method must be used in particular if the axle has a differential. The torque supplied by the central differential to the axle is distributed to the wheels of the axle via the differential. In a normal differential transmission, i.e., not a self-locking differential, half of the torque output at the differential is transmitted to each of the wheels. The transmittable drive torque is limited by the wheel having the worse traction. While one of the wheels slips on the ground surface, the other of the wheels may also not transmit torque. For this reason, means for determining the slipping and the braking device are provided. If the slipping wheel is braked, i.e., a braking torque is applied thereto, at least a force which corresponds to this braking torque may be applied to the ground surface via the other wheel. A part of the drive torque is lost, anyhow, since the braking torque must be applied to the wheel. Therefore, if at least one wheel slips on the ground surface of the vehicle, a part of the drive torque is not available for the propulsion of the vehicle.

BRIEF SUMMARY OF THE INVENTION

The method for operating a vehicle according to the present invention has the advantage over the related art that the part of the drive torque which is available for propelling the vehicle is increased if at least one wheel of the vehicle slips on the ground surface. This is achieved according to the present invention in that a setpoint braking torque is set on the braking device, which is less than the required braking torque, and in that the part of the drive torque supplied to the first axle is increased.

After the slipping of the wheel has been established, the braking torque which is necessary to prevent the slipping is thus initially determined. Subsequently, however, this required braking torque is not set on the braking device, but rather the setpoint braking torque. However, this is less than the required braking torque. Therefore, in spite of the braking of the wheel with the aid of the braking device, the wheel would still slip on the ground surface. In order to prevent this, the part of the drive torque which is supplied to the first axle is increased. The part which is supplied to the second axle, on which the slipping wheel is situated, is therefore reduced simultaneously. The part of the drive torque which is supplied to the second axle is preferably decreased by the difference between the setpoint braking torque and the required braking torque. In this way, the slipping of the wheel is prevented, and the drive torque available for propelling the vehicle is also increased, since the part of the drive torque which is supplied to the first axle is increased. This procedure is advantageous in particular if one wheel associated with the first axle or all wheels associated with the first axle do not slip on the ground surface even if the larger part of the drive torque is applied thereto. It is advantageously provided that the parts of the drive torque which are supplied to the first axle or the second axle may be set in a targeted way. Therefore, it is not merely provided that the central differential is implemented as a self-locking differential, using which a uniform distribution of the drive torque to the first axle and the second axle may be achieved. For example, the slipping of the wheel may be determined in that the speed of the wheel is compared to a reference speed. The latter may be determined from the velocity of the vehicle or from the speed of at least one further wheel.

One refinement of the present invention provides that the central differential is set in such a way that the part of the drive torque supplied to the first axle is increased and the part supplied to the second axle is decreased. As already described above, it is advantageous to be able to set the parts of the drive torque in a targeted way on the central differential. A controlling and/or regulating setting of the central differential is provided. The part supplied to the first axle or the part supplied to the second axle may thus be influenced in a targeted way. For example, a so-called torque vectoring unit may be assigned to the central differential. The torque vectoring unit is preferably electronically controlled and/or regulated. In this way, it is possible to distribute the drive torque arbitrarily onto the first axle and the second axle.

One refinement of the present invention provides that the part of the drive torque supplied to the first axle is set in such a way that it does not exceed a certain maximum torque. This maximum torque may be limited, for example, by a permissible application to the first axle. This is the case in particular if the first axle has a differential or the like. In this case, it must be ensured that the permissible torque for such a component is maintained. The setpoint braking torque is set in such a way that it only has a difference from the required braking torque at which the part of the drive torque, which is applied to the first axle due to the redirection of the drive torque from the second axle to the first axle, does not exceed the maximum torque. In this way, damage to the first axle or the vehicle is prevented.

One refinement of the present invention provides that a torque-sensing central differential is used as the central differential. Such a central differential is also referred to as a Torsen central differential. The Torsen central differential has a self-locking effect, so that it automatically displaces the drive torque to the axle at which the greater force may be applied to the ground surface. Therefore, if the setpoint braking torque, which is less than the braking torque required for preventing the slipping, is set on the braking device of the wheel, the force which acts on the wheel is thus decreased. The Torsen central differential will subsequently automatically increase the part of the drive torque which is supplied to the first axle, so that the part applied to the second axle is decreased.

One refinement of the present invention provides that a differential, in particular an open differential, a self-locking differential, and/or a differential lock, is used for the first axle and/or the second axle. Torque may be distributed to wheels of the axle with the aid of the differential. The self-locking differential is used for the purpose of reducing or preventing the slipping of a wheel of the axle having the lesser traction. For this purpose, it is provided that the particular axle is stiffened, i.e., the distribution of the torque supplied to the axle is restricted to the wheels of the axle. Alternatively, a greater torque may also be distributed to the wheel having the better traction. The differential lock is a special case of the self-locking differential, in which only the compensation function of the differential may be completely turned on or off.

One refinement of the present invention provides that a torque vectoring unit is assigned to the differential of the first axle. The torque which is applied to the axle may in principle be distributed arbitrarily to the wheels of the axle with the aid of the torque vectoring unit. It is therefore possible to transfer the torque in a targeted way to the wheel, via which the greater force may be applied to the ground surface of the vehicle. If the torque vectoring unit is associated with the first axle, a particularly advantageous specific embodiment of the method according to the present invention may be implemented. In this case, the drive torque available for the propulsion of the vehicle may also be increased if multiple wheels of the vehicle slip on the ground surface. If the slipping of the wheel of the second axle is determined in the above-described way, this wheel is braked and the part of the drive torque supplied to the first axle is accordingly increased. The absolute value by which the part is increased is added with the aid of the torque vectoring unit to the wheel of the first axle which does not slip. In the case of an all-wheel-drive vehicle having four wheels, for example, two wheels of one track, i.e., wheels situated one behind the other, may be located on a slippery ground surface, while this is not the case for the other two wheels (of the other track). The first axle has the torque vectoring unit, while the second axle only has a differential. In this way, when the slipping of the wheels on the slippery ground surface is determined, the wheel of the second axle may be braked using the setpoint braking torque and the additional drive torque thus available may be supplied to the first axle. For the first axle, however, the slipping of one wheel is also determined, so that nearly all of the torque transmitted to the first axle is supplied to the wheel which is not situated on the slippery ground surface. In this way, the propulsion of the vehicle may be optimized, even if more than one wheel slips on the ground surface of the vehicle or is situated on a slippery ground surface.

One refinement of the present invention provides that torque is transferred from a first wheel of the first axle to a second wheel with the aid of the torque vectoring unit when slipping of the first wheel is determined. The second wheel is also associated with the first axle. The advantages of such a procedure were already discussed above. Means are also associated with the first axle in order to determine the slipping of the wheel provided thereon. In contrast to the second axle, however, the slipping wheel is not braked with the aid of a braking device, but rather the torque vectoring unit is set so it controls and/or regulates in such a way that the torque is transferred from the slipping wheel to the non-slipping wheel. This is advantageously performed so that both wheels do not slip (any longer).

One refinement of the present invention provides that the torque vectoring unit is designed for the purpose of transferring the maximum torque to the second wheel. To avoid damage to the torque vectoring unit, the maximum torque is established which may be safely transferred to the second wheel without damage occurring. It is advantageous if the part of the drive torque supplied to the first axle is simultaneously set in such a way that the certain maximum torque is not exceeded. The difference between the setpoint braking torque and the required braking torque for the wheel of the second axle is limited to the maximum torque, so that the torque vectoring unit or another component is not damaged.

Furthermore, the present invention relates to a vehicle, in particular for implementing the above-described method, having a first axle, a second axle, means for determining slipping of at least one wheel, which is provided on the second axle, on a ground surface of the vehicle, and a braking device associated with the wheel, a drive torque being able to be applied to the first axle and the second axle via a central differential, and a device of the vehicle being designed for the purpose, in the event of slipping of the wheel, of determining a braking torque required to prevent the slipping. The device is additionally designed for the purpose of setting a setpoint braking torque on the braking device, which is less than the required braking torque, and increasing the part of the drive torque supplied to the first axle. For example, the device is part of an ESP system. The described vehicle may provide stronger propulsion on a slippery ground surface than the vehicles known from the related art. It is advantageous if the first axle has a differential, to which a torque vectoring unit is assigned. Through appropriate setting of the setpoint braking torque and the increase of the part of the drive torque which is applied to the first axle, the central differential may be held in a stable operating range. The driving comfort of the vehicle is thus also increased, since "rupture" of the central differential, which is preferably a Torsen central differential, is prevented.

DETAILED DESCRIPTION OF THE INVENTION

Figure 1:
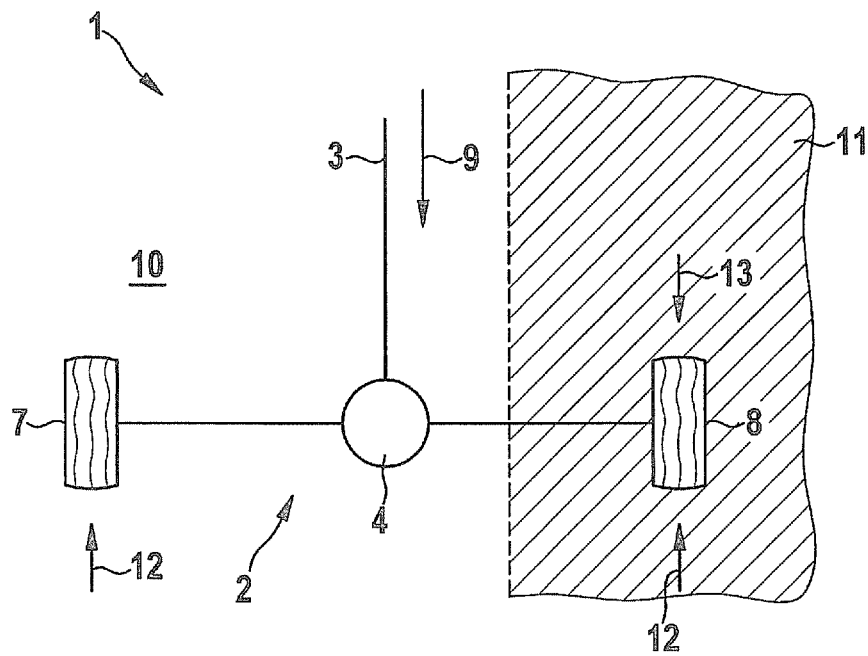
FIG. 1 shows a first axle of a vehicle having a differential.

FIG. 1 shows an area of a vehicle 1, in particular a motor vehicle, a first axle 2 and a first drive shaft 3 associated therewith being shown. Axle 2 has a differential 4, also referred to as a transverse differential, which is attached, on the one hand, to drive shaft 3 and, on the other hand, via axle areas 5 and 6 to wheels 7 and 8, i.e., is operationally linked thereto. Braking devices (not shown) are associated with each of wheels 7 and 8, using which a braking torque may be applied to each of the wheels independently. A drive torque is supplied from a drive assembly of vehicle 1 to differential 4 in the direction of arrow 9 via drive shaft 3. This drive torque is distributed to wheels 7 and 8 via differential 4, so that one part of the drive torque is transmitted to wheel 7 and a further part of the drive torque is transmitted to wheel 8. A ground surface 10 on which the vehicle stands is slippery at least in some areas, i.e., it has a low coefficient of friction. This area is identified as area 11 in FIG. 1. It is therefore obvious that only wheel 8 is situated in this slippery area 11.

Only a small force may therefore be applied to ground surface 10 via wheel 8—in comparison to wheel 7. The force which the torque transmitted from differential 4 to wheels 7 and 8 would cause if wheels 7 and 8 were situated on a ground surface 10 having the same coefficient of friction is indicated by arrows 12. However, due to slippery area 11, wheel 8 slips on ground surface 10. This is determined by means (not shown) for determining the slipping of wheel 8, upon which a device provided for this purpose, which is part of an ESP system, for example, determines a braking torque which must be applied to wheel 8 to prevent the slipping. This braking torque is subsequently applied to wheel 8 with the aid of a braking device (not shown). The force which corresponds to this braking torque is indicated by arrow 13. It is clear that the force caused by the braking torque and the force caused by the drive torque are equal in the case shown here, so that wheel 8 is completely braked. This prevents wheel 8 from slipping. In the latter case, differential 4 may no longer supply torque to wheel 7, because the transmittable drive torque would be limited by the slipping wheel. Because of the braking of wheel 8, at least a part of the drive torque which corresponds to the braking torque may be supplied to wheel 7. An electronic differential lock, as is known from the related art, is implemented in this way.

Figure 2:
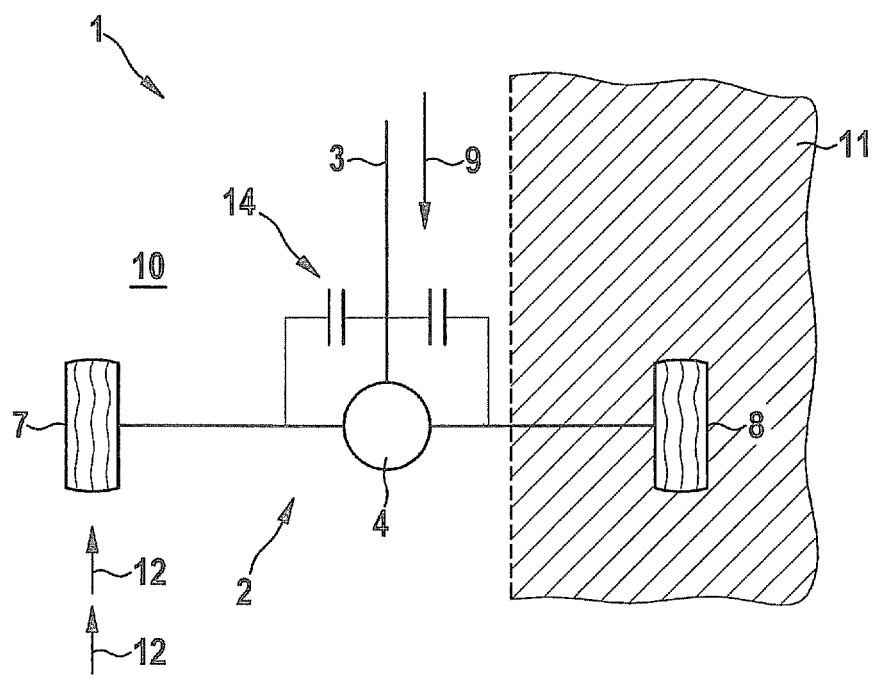
FIG. 2 shows the first axle of the vehicle, a torque vectoring unit being assigned to the differential.

FIG. 2 also shows first axle 2 of vehicle 1. As described above, wheels 7 and 8 are situated on ground surface 10, wheel 8 being situated in slippery area 11 thereof. A torque vectoring unit 14 is assigned to differential 4 in this case. The drive torque (arrow 9) supplied to axle 2 may be transferred in a targeted way to one of wheels 7 or 8 in this torque vectoring unit. If it is determined that wheel 8 slips on ground surface 10, since it is situated in area 11, torque vectoring unit 14 is set in such a way that the entire drive torque is transferred to wheel 7. This is shown by both arrows 12. In vehicle 1 shown in FIG. 2, a force which corresponds to the total drive torque may thus be applied to ground surface 10 via wheel 7 with the aid of torque vectoring unit 14. In contrast thereto, it is only possible in the vehicle shown in FIG. 1 to apply a force which corresponds to a braking torque of wheel 8, which is situated in area 11. Vehicle 1 as shown in FIG. 2 is also known from the related art.

Figure 3:
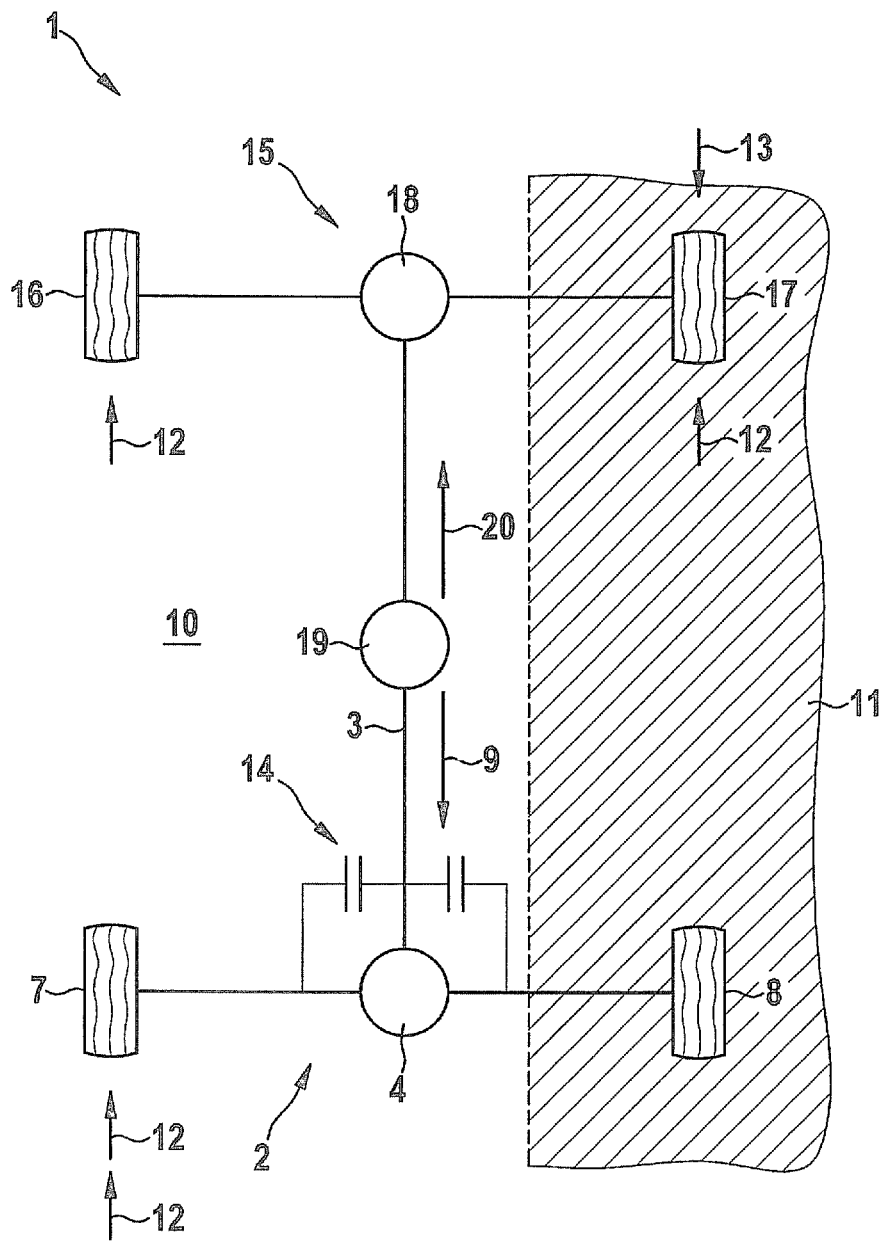
FIG. 3 shows a vehicle having two driven axles, a drive torque being able to be applied to the axles via a central differential, and both the first axle and the second axle having a differential, the torque vectoring unit only being assigned to the differential of the first axle.

FIG. 3 shows vehicle 1 having first axle 2, which again has differential 4, wheels 7 and 8, and torque vectoring unit 14. However, vehicle 1 additionally has a second driven axle 15 including wheels 16 and 17 and a differential 18. Axles 2 and 15 may be coupled to one another or may have a drive torque applied thereto via a central differential 19, which is provided as a Torsen central differential. A first part of the drive torque is supplied to first axle 2 (arrow 9) and a second part is supplied to axle 15 (arrow 20). The part which is supplied to first axle 2 may be distributed further to wheels 7 and 8 in a targeted way with the aid of torque vectoring unit 14. The part which is supplied to second axle 15 is also distributed to wheels 16 and 17 by differential 18, no targeted influence on the distribution being possible, however.

In the example shown here, wheels 8 and 17 are situated in area 11 of ground surface 10 having the low coefficient of friction. This means that when the drive torque is applied to axles 2 and 15, wheels 8 and 17 slip on ground surface 10. This is determined with the aid of suitable means. A braking torque is subsequently determined for wheel 17, which is necessary to prevent the slipping. However, on the braking device associated with wheel 17, this required braking torque is not set, but rather a setpoint braking torque, which is less than the required braking torque. Therefore, only a small torque acts on wheel 17, since it may apply no force or only a small force to ground surface 10.

Torsen central differential 19 is designed for the purpose of distributing the parts of the drive torque in such a way that the greater part of the drive torque is supplied to axle 2 or 15, using which a greater force may be applied to ground surface 10. Through the setting of the setpoint braking torque, which is less than the required braking torque, the torque which may be transmitted via axle 15 becomes less, because the braking torque no longer counteracts the drive torque. Central differential 19 will therefore increase the part of the drive torque which is supplied to first axle 2. If it is simultaneously determined that wheel 8 also slips on ground surface 10, torque vectoring unit 14 is used for the purpose of distributing the supplied part of the drive torque to wheels 7 and 8 in such a way that the slipping of wheel 8 is prevented. For this purpose, torque vectoring unit 14 is set so it controls and/or regulates. If no force at all may be applied to ground surface 10 with the aid of wheel 8, the entire part of the drive torque which is supplied to first axle 2 is transferred to wheel 7 with the aid of torque vectoring unit 14. This is indicated by arrows 12.

In vehicle 1 shown in FIG. 3, in the event of slipping of wheels 7, 8, 16, and/or 17, the greater part of the drive torque is therefore supplied to axle 2 or 15, which has torque vectoring unit 14. In this way, the drive torque may be converted into propulsion of vehicle 1 in a targeted way.

What is claimed is:

1. A method for operating a vehicle having a first axle and a second axle, the method comprising:
    applying a drive torque to the first axle and the second axle via a central differential;
    determining slipping of at least one wheel of the second axle on a ground surface; and
    in the event of slipping of the at least one wheel of the second axle, performing the following:
        determining a braking torque required to stop the slipping;
        setting a setpoint braking torque on a braking device assigned to the at least one wheel of the second axle, wherein the setpoint braking torque is less than the braking torque required to stop the slipping; and
        increasing the proportion of the drive torque supplied to the first axle.

2. The method as recited in claim 1, wherein the central differential is set in such a way that the proportion of the drive torque supplied to the first axle is increased and the proportion of the drive torque supplied to the second axle is decreased.

3. The method as recited in claim 2, wherein the amount of the drive torque supplied to the first axle is limited to a predefined maximum torque.

4. The method according to claim 3, wherein the central differential is a torque-sensing central differential.

5. The method as recited in claim 3, wherein at least one of an open differential, a self-locking differential, or a differential lock is used for at least one of the first axle and the second axle.

6. A method for operating a vehicle having a first axle and a second axle, the method comprising:

applying a drive torque to the first axle and the second axle via a central differential;
determining slipping of at least one wheel of the second axle on a ground surface; and
in the event of slipping of the at least one wheel of the second axle, performing the following:
    determining a braking torque required to stop the slipping;
    setting a setpoint braking torque on a braking device assigned to the at least one wheel of the second axle, wherein the setpoint braking torque is less than the braking torque required to stop the slipping; and
    increasing the proportion of the drive torque supplied to the first axle;
wherein the central differential is set so that the proportion of the drive torque supplied to the first axle is increased and the proportion of the drive torque supplied to the second axle is decreased,
wherein the amount of the drive torque supplied to the first axle is limited to a predefined maximum torque, and
wherein a torque vectoring unit is assigned to the differential of the first axle.

7. The method as recited in claim 6, wherein torque is transferred from a first wheel of the first axle to a second wheel of the first axle with the aid of the torque vectoring unit if slipping of the first wheel of the first axle is determined.

8. The method as recited in claim 7, wherein the torque vectoring unit is configured to implement transferring of the predefined maximum torque to the second wheel.

9. A drive-train system of a vehicle, comprising:
a first axle and a second axle;
a control unit configured to determine slipping of at least one wheel provided on the second axle on a ground surface;
a braking device associated with the at least one wheel;
a central differential configured to apply a drive torque to the first axle and the second axle; and
configured to perform, in the event of slipping of the at least one wheel of the second axle, the following: (i) determine a braking torque required to stop the slipping; (ii) set a setpoint braking torque on a braking device assigned to the at least one wheel of the second axle, wherein the setpoint braking torque is less than the braking torque required to stop the slipping; and (iii) increase the proportion of the drive torque supplied to the first axle.

10. A control system for operating a vehicle having a first axle and a second axle, comprising:
an applying arrangement to apply a drive torque to the first axle and the second axle via a central differential;
a determining arrangement to determine a slipping of at least one wheel of the second axle on a ground surface; and
a device configured to perform, in the event of slipping of the at least one wheel of the second axle, the following: (i) determine a braking torque required to stop the slipping; (ii) set a setpoint braking torque on a braking device assigned to the at least one wheel of the second axle, wherein the setpoint braking torque is less than the braking torque required to stop the slipping; and (iii) increase the proportion of the drive torque supplied to the first axle.

11. The control system as recited in claim 10, wherein the central differential is set so that the proportion of the drive torque supplied to the first axle is increased and the proportion of the drive torque supplied to the second axle is decreased, wherein the amount of the drive torque supplied to the first axle is limited to a predefined maximum torque, and wherein a torque vectoring unit is assigned to the differential of the first axle.

12. The control system as recited in claim 11, wherein torque is transferred from a first wheel of the first axle to a second wheel of the first axle with the aid of the torque vectoring unit if slipping of the first wheel of the first axle is determined 13. The control system as recited in claim 12, wherein the torque vectoring unit is configured to implement transferring of the predefined maximum torque to the second wheel.

14. The drive-train system as recited in claim 9, wherein the central differential is set so that the proportion of the drive torque supplied to the first axle is increased and the proportion of the drive torque supplied to the second axle is decreased, wherein the amount of the drive torque supplied to the first axle is limited to a predefined maximum torque, and wherein a torque vectoring unit is assigned to the differential of the first axle.

15. The drive-train system as recited in claim 14, wherein torque is transferred from a first wheel of the first axle to a second wheel of the first axle with the aid of the torque vectoring unit if slipping of the first wheel of the first axle is determined.

16. The drive-train system as recited in claim 15, wherein the torque vectoring unit is configured to implement transferring of the predefined maximum torque to the second wheel.

17. The method as recited in claim 2, wherein the amount of the drive torque supplied to the second axle is decreased by a difference between the setpoint braking torque and the required braking torque.

18. The method as recited in claim 1, wherein a comparison between a speed of the at least one wheel to a reference speed is used to determine whether the at least one wheel of the second axle is slipping on the ground surface.

19. The method as recited in claim 6, wherein the torque vectoring unit is electronically controlled.

* * * * *